United States Patent [19]

Cavezzan et al.

[11] Patent Number: 4,640,939
[45] Date of Patent: Feb. 3, 1987

[54] ORGANOPOLYSILOXANE COMPOSITIONS FOR ANTIADHESIVE/RELEASE COATINGS

[75] Inventors: Jacques Cavezzan, Villeurbanne; Gerard Soula, Meyzieu, both of France

[73] Assignee: Rhone-Poulenc Specialites Chimiques, Courbevoie, France

[21] Appl. No.: 787,065

[22] Filed: Oct. 15, 1985

[30] Foreign Application Priority Data

Oct. 15, 1984 [FR] France ............................... 84 15745

[51] Int. Cl.$^4$ ............................................. C08F 2/46
[52] U.S. Cl. ........................................ 522/99; 528/15; 528/31; 528/32; 427/387; 428/447
[58] Field of Search ............................ 528/15, 31, 32; 427/387; 428/447; 522/99

[56] References Cited

U.S. PATENT DOCUMENTS

| | | | |
|---|---|---|---|
| 4,172,101 | 10/1979 | Getson | 522/99 |
| 4,293,677 | 10/1981 | Imai | 528/15 |
| 4,448,815 | 5/1984 | Grenoble et al. | 528/15 |
| 4,533,575 | 8/1985 | Melancon | 528/15 |

FOREIGN PATENT DOCUMENTS 0051384 5/1982 European Pat. Off.
1057151 3/1954 France.
1538058 7/1968 France.
2204657 10/1973 France.

*Primary Examiner*—Melvyn I. Marquis
*Attorney, Agent, or Firm*—Burns, Doane, Swecker & Mathis

[57] ABSTRACT

Gelation-resistant, high pot life organopolysiloxane compositions adapted for antiadhesive/release coating applications, are comprised of (1) at least one substantially straight-chain organopolysiloxane having a viscosity ranging from about 50 to 100,000 mPa.s at 25° C. and containing at least x alkenyl unsaturated hydrocarbon groups bonded to a silicon atom, per molecule, wherein $x \geq 2$, (2) at least one organohydropolysiloxane crosslinking agent having a viscosity ranging from about 10 to 100,000 mPa.s at 25° C. and containing at least y hydrogen atoms bonded to silicon atoms, per molecule, wherein $y \geq 2$, (3) a catalytically effective amount of a platinum group metal crosslinking catalyst, and (4) an effective amount of at least one azodicarboxylate gelation inhibitor which is inert to the activity of said catalyst (3), but in insufficient amount as to prevent the crosslinking of said polysiloxanes (1) and (2) under crosslinking conditions.

17 Claims, No Drawings

ORGANOPOLYSILOXANE COMPOSITIONS FOR ANTIADHESIVE/RELEASE COATINGS

BACKGROUND OF THE INVENTION

1. Field of the Invention

The present invention relates to an organopolysiloxane coating composition especially adapted for providing antiadhesive coatings, said composition incorporating a novel inhibitor and being particularly useful in the manufacture of paper and other substrate bearing peelable coatings.

2. Description of the Prior Art

Organopolysiloxane compositions have long been known to this art as being useful to render surfaces non-adhesive to materials to which they would normally adhere.

These known compositions incorporate:

(1) an organopolysiloxane incorporating hydrocarbon groups with aliphatic alkenyl or acetylenic unsaturation, in particular vinyl groups bonded to the silicon atoms, (2) an organohydropolysiloxane, (3) a catalyst of platinum group metal, and (4) an inhibitor which retards, at ambient temperature, the bonding to a group containing aliphatic unsaturation of a hydrogen atom bonded to a silicon atom, or the reaction of a silanol group with a group $\equiv$SiH.

After application to a substrate, these compositions set under the influence of an energy input by suitable treatment (heat treatment, ultraviolet (UV) or infrared ray treatment, ionizing raditation, and the like).

Such compositions, which are diluted or undiluted with a solvent, are, for example, described in French Patents Nos. 2,128,520; 2,291,254; 2,372,874; and 2,456,767.

These compositions are generally stored prior to use in the form of 2-component or 2-package compositions, the 2 components being mixed just before they are used in the form of a single composition and the principal problem to solve consists in avoiding a premature gelling of the mixture for as long a period as possible, while retaining a very good bath reactivity during the treatment for cross-linking the composition.

A great many inhibitors for the platinum group catalysts have already been proposed in the prior art, these inhibitors being capable of being employed alone or in combination and partially meeting the objectives of the present invention.

Thus, it has been proposed, in particular, to use alkylthioureas (U.S. Pat. No. 3,188,299), triallyl isocyanurates (U.S. Pat. No. 3,882,083), dialkylacetylenedicarboxylates (U.S. Pat. No. 4,347,346), a straight-chain or cyclic alkylvinylsiloxane as described in U.S. Pat. Nos. 3,516,946 and 3,775,452 and in French Patent No. 1,548,775.

U.S. Pat. No. 3,445,420 suggests, as an inhibitor, an acetylenic organic compound having a boiling point of at least 25° C. and at least one group —C$\equiv$C—; inhibitors of this type are also described in European Patent No. 94,185.

In French Patent No. 2,456,767 dialkyl carboxylic esters have been proposed, such as diallyl maleate.

The inhibitors of the prior art made it possible to advance the technology of the antiadhesive treatments, but they suffer from at least one of the following disadvantages:

(i) the "pot life" or "bath life" is inadequate;

(ii) the inhibitors employed are toxic and/or lachrymatory and/or costly products;

(iii) crosslinking must be carried out at temperatures which are too high, and/or (iv) the crosslinking is insufficient and the layer obtained does not have the intended properties.

SUMMARY OF THE INVENTION

Accordingly, a major object of the present invention is the provision of an improved organopolysiloxane coating composition especially adapted for providing antiadhesive layers to a variety of substrates, and said improved composition containing a novel inhibitor which imparts remarkably notable properties thereto, enabling the elimination, or at least the marked diminution, of the aforesaid disadvantages and drawbacks to date characterizing the state of this art.

Briefly, the present invention features an organopolysiloxane composition comprising:

(1) at least one substantially straight-chain organopolysiloxane having a viscosity of from approximately 50 to 100,000 mPa.s at 25° C. and containing, per molecule, at least x hydrocarbon groups containing alkenyl, preferably vinyl unsaturation, which groups are bonded to a silicon atom, and with $x \geq 2$;

(2) at least one organohydropolysiloxane having a viscosity of from approximately 10 to 100,000 mPa.s at 25° C., containing per molecule, at least y hydrogen atoms bonded to a silicon atom, and with $y \geq 2$ and $x + \geq 5$;

(3) a catalytically effective amount of a platinum group metal catalyst; and (4) an amount of at least one azodicarboxylate inhibitor which is effective for inhibiting the formation of a gel at ambient temperature, but in such amount which is insufficient to prevent crosslinking during the crosslinking treatment, and having on each of the carboxylate groups an organic radical which does not exert an unfavorable influence on the catalytic activity of the compound (3), and preferably having a boiling point of at least 25° C. Inhibitors which are solid products at ambient temperature of 25° C. can also be employed if they are soluble in an organic solvent which is compatible with the organosiloxane compositions, such as hexane, toluene, chlorobenzene and the like. An organic radical which is more particularly suitable is an alkyl radical.

DETAILED DESCRIPTION OF THE INVENTION

More particularly according to the present invention, the subject azodicarboxylate preferably has the following general formula:

$$R_1OOC-N=N-COOR_2 \quad (I)$$

in which $R_1$ and $R_2$, which are identical or different, denote a straight-chain or branched alkyl radical containing from 1 to 12 carbon atoms, preferably from 1 to 4 atoms.

The compounds corresponding to the formula (I) are, in the majority of cases, known cmpounds, and in any event a general process for the preparation of all such compounds is described, in particular, in Ingold and Weaver, *J. Chem. Soc.*, 127, pp. 378–387, especially the synthesis of ethyl azodicarboxylate.

Preferably, the inhibitors selected are ethyl azodicarboxylate and methyl azodicarboxylate.

Since the active moiety of the inhibitor is the group —OOC—N=N—COO—, as explained in greater detail below, the invention envisages the chemical products incorporating these groups and corresponding to the above definition such as, for example, alkylbisazodicarboxylates of the formula:

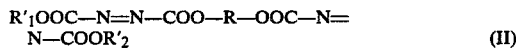
(II)

in which $R'_1$ and $R'_2$ have the same meaning as above and —R— is an alkylene chain of formula —$(CH_2)_n$—, with n being an integer of from 1 to 12.

The synthesis of these products is described by Norman Rabjohn, *Journal of the American Chemical Society*, 70, pp. 1181–1183 (March, 1948).

Compound (1) is a substantially straight-chain organopolysiloxane which is preferably a polydiorganosiloxane containing from 1.9 to 2.1 organic radicals per silicon atom and containing, per molecule, at least $x \geq 2$ hydrocarbon radicals having alkenyl, preferably vinyl, unsaturation.

The other radicals in the polydiorganosiloxane may be any type of organic radical free from aliphatic unsaturation, provided that they do not exert an unfavorable influence on the catalytic activity of the component (3) of the composition. Consequently, the other radicals can be, for example, alkyl or cycloalkyl radicals such as ethyl, propyl, decyl, tetradecyl, eicosyl and cyclohexyl; aryl radicals such as phenyl and naphthyl; and halogenated hydrocarbon radicals such as bromophenyl and 3,3,3-trifluorpropyl.

Preferably, at least 60 mole % of the radicals R are methyl. The compound (1) at 25° C. has a viscosity of 50 mPa.s up to the viscosity of a gum (approximately 100,000 mPa.s).

By "substantially straight-chain" is understood a polymer or a copolymer with a straight or partly branched chain.

The groups containing alkenyl, preferably vinyl, unsaturation may be at the end of the polymer chain, within the chain, or both at the same time. The compound (1) preferably contains only methyl and vinyl radicals.

Compounds (1) are well-known and are described, in particular, in U.S. Pat. Nos. 3,220,972; 3,344,111; and 3,434,366.

Examples of compounds (1) are polydimethylsiloxanes with dimethylvinylsiloxy end groups, polydimethylpolymethylvinylsiloxane copolymer with dimethylvinylsiloxy end groups, and polydimethylpolymethylvinylsiloxane copolymer with trimethylsiloxy end groups.

The vinyl group does not exceed 10% by weight, preferably 3% by weight for the polymers comprised solely of vinyl and methyl radicals.

The compound (2) is a straight-chain or cyclic organohydropolysiloxane having a viscosity of from 10 to 100,000 mPa s. It incorporates at least y groups ≡SiH per molecule, where $y \geq 2$, preferably $y \geq 3$ and $x + y \geq 5$.

The content by weight of hydrogen atoms bonded to silicon does not exceed 1.67 and preferably ranges from 0.1 to 1.6% for the polymers containing only the groups ≡SiH and ≡Si-CH$_3$.

The silicon valencies which are not satisfied by hydrogen atoms and the siloxane oxygen atoms are satisfied, preferably, by methyl, ethyl and/or phenyl groups.

The groups ≡SiH may be situated within or at the polymer ends or both within and at the ends of the organohydropolysiloxane.

Representative are, for example, polymethylhydrosiloxane having trimethylsiloxy end groups, polydimethylpolymethylhydrosiloxane copolymer having trimethylsiloxy end groups and polydimethylpolymethylhydrosiloxane copolymer having hydrodimethylsiloxy end groups.

Compounds (2) are also well-known and are described, for example, in U.S. Pat. Nos. 3,220,972; 3,341,111 and 3,436,366 and 3,697,473. In particular, detailed information on methylhydropolysiloxanes, which are the preferred compounds (2), will be found in column 4 of U.S. Pat. No. 3,697,473.

The total of the number of unsaturated groups (alkenyl, preferably vinyl) per molecule of compound (1) and of the number of groups ≡SiH per molecule of compound (2) should be equal to or greater than 5 such as to produce a crosslinked material during the crosslinking of the organopolysiloxane composition.

The ratio of the number of groups ≡SiH to vinyl groups is generally greater than 0.4 and generally smaller than 2 and preferably ranges from 0.7 to 1.4.

In coating applications and more particularly in the applications for antiadhesion of paper, use may be made, per 100 parts by weight of compound (1), of 0.1 to 50 parts by weight of compound (2) and of 0.01 to 3 parts, preferably from 0.04 to 0.5 parts, by weight of compound (4).

As the catalyst (3), advantageously used are complexes of a platinum group metal, particularly platinum-olefin complexes as described in U.S. Pat. Nos. 3,159,601 and 3,159,662, the reaction products of platinum derivatives with alcohols, aldehydes and ethers, described in U.S. Pat. No. 3,220,972, platinum-vinylsiloxane catalysts described in French Patent No. 1,313,846 and its Patent of Addition No. 88,676, and French Patent No. 1,480,409, and the complexes described in U.S. Pat. Nos. 3,715,334; 3,775,452 and 3,814,730, or a rhodium-containing catalyst such as described in U.S. Pat. Nos. 3,296,291 and 3,928,629.

The preferred platinum group metals are platinum and rhodium; ruthenium, though less active but less costly, can also be employed.

The inhibitors according to the invention provide particularly interesting results with platinum-vinyl siloxane complexes, in particular the 1,1,3,3-tetramethyl 1,3-divinyldisiloxane complex and platinum-methylvinyl cyclotetrasiloxane complexes, in particular the complex of platinum with 1,3,5,7-tetramethyl-1,3,5,7-tetravinylcyclo tetrasiloxane.

The quantity of catalyst complexes (3) and inhibitor (4) to be added depends particularly on the compositions, the catalyst type and the intended application, and one skilled in this art will have no difficulty in determining such quantity. In general, for coating compositions, the catalyst content ranges from approximately 5 to 1,000 ppm, preferably from 20 to 100 ppm (calculated on the weight of precious metal).

It too has been found in accordance with this invention, that very small amounts of inhibitor (4) permit the pot life of solvent-free compositions which are intended for the treatment of antiadhesion paper to be extended in an exceptional manner without, however, affecting the hardening time of the composition when heated, these compositions being stored at a common ambient temperature, namely, below 40°–45° C., preferably below 25° C.

Without wishing to be bound to any particular scientific theory, the extremely advantageous properties of the inhibitor according to the invention may be explained as follows:

The inhibitor (4) according to the invention, in fact, complexes with the catalyst in a manner which is completely different from that of other known inhibitors. Thus, when a nuclear magnetic resonance (NMR) spectrum of $195_{Pt}$ is produced, a catalyst-inhibitor complex (in the case, for example, where the inhibitor is methyl maleate, described in French Patent No. 2,456,767) shows a signal characteristic of the formation of a diamagnetic complex.

Now, such a signal in the $195_{Pt\ NMR}$ spectrum does not appear when the inhibitor (4) is an azodicarboxylic ester. On the other hand, a signal appears when a paramagnetic electronic resonance (PER) spectrum is produced, which evidences the formation of a paramagnetic platinum complex, this signal not appearing with the known inhibitors, in particular methyl maleate.

This paramagnetic complex becomes diamagnetic after UV irradiation, the platinum is activated, and the azodicarboxylate is converted to the corresponding hydrazine. The paramagnetic complex is formed when the platinum is in low oxidation states and, to be more precise, in the oxidation states O and II, in the catalyst compound (3) as defined above.

The principal advantage of the formation of this paramagnetic complex is that, in contrast to the diamagnetic complexes, it is much more stable, particularly at a high temperature.

As a result, the pot life or the bath life of the compositions inhibited in this way is longer. To destroy the paramagnetic complex and to activate the catalyst it is necessary to convert the paramagnetic complex into a diamagnetic complex, preferably by subjecting the organopolysiloxane composition, preferably in the form of a thin layer, to UV radiation and, if appropriate, to effect the crosslinking of this layer using known means, in particular by a heat treatment between 80° and 180° C., generally between 90° and 120° C. However, at low inhibitor contents and with coating thicknesses greater than 20 μm heat treatment can be sufficient.

During this UV treatment the paramagnetic complex as such is already a photosensitizer, if only due to its catalytic component (3), as already described in French Patent No. 2,183,125, and it is generally unnecessary to add to the organopolysiloxane composition a photosensitizer of the benzophenone, anthraquinone or benzoin ether type.

The UV radiation employed has a wave length of between 200 and 400 nanometers, preferably on the order of 254 nanometers and 360 nanometers.

The irradiation time may be very short and less than 1 sec.

The present invention, consequently, also features a process for crosslinking a coating composition in the form of a thin layer, in accordance with which at least a portion of the energy input for crosslinking is provided by UV radiation.

According to the invention, by a "thin layer" there is intended a layer of a thickness of from about 0.1 to 500 μm, preferably from 0.5 to 20 μm.

The compositions of the invention typically show a high inhibition of hardening when they are employed as such or diluted with a solvent. When they are dispersed in or diluted with a solvent, use is made of a volatile organic solvent compatible with the composition, selected, for example, from among the alkanes, petroleum cuts containing paraffinic compounds, toluene, heptane, xylene, isopropanol, methyl isobutyl ketone, tetrahydrofuran, chlorobenzene, chloroform, 1,1,1-trichloroethane, and monoethylene glycol and methylene glycol derivatives.

Preferably, the solvent constitutes from 50 to 99% by weight of the dispersion.

As a result of a UV radiation treatment and of evaporation of the solvent from the dispersion, the composition hardens and these dispersions are therefore useful as coating compositions for metal, wood, or glass articles and for flexible sheets of paper, plastic, and the like.

The compositions according to the invention are preferably used as solvent-free compositions to render non-adhesive a material such as sheets of metal, glass, plastics or paper, to other materials to which it would normally adhere and, in the case of a solvent-free composition, the composition advantageously has a viscosity not exceeding 5,000 mPa.s, preferably ranging from 20 to 4,000 mPa.s at 25° C.

The invention thus features a process enabling sheets of a flexible material to be made non-adhesive to surfaces to which they normally adhere, a process characterized in that it consists of applying a quantity of a composition according to the invention which generally ranges from 0.1 to 5 g per m$^2$ of the surface to be coated and crosslinking the composition by an energy input at least a portion of which is provided by UV radiation.

At ambient temperature, the gel times of these diluted or undiluted compositions may be greater than 24 hours, in most cases several days, and the catalyst is reactivated at a higher temperature, usually exceeding 80° C., and from 90° to 120° C., in the presence of UV.

The solvent-free, that is to say, undiluted, compositions, are applied by means of devices capable of depositing small amounts of liquids in a uniform manner. For this purpose, use can be made, for example, of the device called "Helio glissant" incorporating, in particular, 2 superposed cylinders: the function of the cylinder placed at the bottom, immersed in the coating trough where the compositions are present, is to impregnate the top cylinder with a very thin layer, the function of the top cylinder being then to deposit on the paper the required amounts of the compositions with which it is impregnated; such metering is obtained by regulating the relative speed of both cylinders which rotate in opposite directions to each other.

The diluted compositions, that is to say, those containing a solvent, may be applied by means of the devices employed in industrial paper-coating machines, such as the engraved cylinder "Mille points", or the system called "Reverse Roll". Once deposited on the substrates, the compositions are hardened by an energy input, at least a portion of which is provided by UV radiation, in a few seconds, by passing under a UV light and in tunnel ovens heated to about 60°–200° C.; the residence time in these ovens generally varies from 2 to 30 seconds. For a given length of the ovens, it is a function of the speed at which the coated substrates travel (this speed can exceed 200 meters per minute); a substrate consisting of cellulosic materials generally travels faster (for example, at a speed of 3 m/second at a temperature above 140° C.) than a plastic-based substrate. In fact, the latter cannot be subjected to the action of high temperatures, and will consequently be subjected to a lower temperature but for a longer period, for example, it will travel at a rate of 0.75 m/second at a temperature on the order of 80° C.

Preliminary UV irradiation may be carried out by passing the paper under an at least 1 UV lamp beforehand.

The amounts of compositions deposited onto the substrates can vary and in most cases range from 0.1 to 5 g/m² of treated surface. These amounts depend upon the nature of the substrates and on the required antiadhesive properties. In most cases, same range from 0.5 to 1.5 g/m² for nonporous substrates.

The compositions may also contain a cycloorganopolysiloxane compound containing vinyl and methyl groups, preferably in the form of a tetramer such as, for example, 1,3,5,7-tetramethyl-1,3,5,7-tetravinylcyclotetrasiloxane.

In order to further illustrate the present invention and the advantages thereof, the following specific examples are given, it being understood that same are intended only as illustrative and in nowise limitative.

EXAMPLE 1

A processing bath was prepared according to the following operating procedure:

To 100 parts of a silicone composition bath containing:
  (a) 90.5% of a polydimethylsiloxane copolymer containing vinyl moieties in the chain and a dimethylvinylsiloxy end group, having approximately 3% by weight of vinyl groups and a viscosity of approximately 250 mPa.s at 25° C.,
  (b) 2.5% of 1,3,5,7-tetramethyl-1,3,5,7-tetravinyl cyclotetrasiloxane, and
  (c) 7% of a polymethylhydrosiloxane fluid with a trimethylsiloxy end group, employed as a crosslinking agent, containing approximately 1.5% by weight of hydrogen atoms bonded to silicon and having a viscosity of approximately 20 mPa.s at 25° C., were added:
    (i) 60 ppm of platinum ($3.10^{-4}$ g-atom of Pt/kg of composition) in the form of a platinum complex prepared from chloroplatinic acid and 1,1,3,3-tetramethyl-1,3-divinyldisiloxane, as described in U.S. Pat. No. 3,814,730 and
    (ii) 0.08% by weight of ethyl azodicarboxylate (EADC), i.e., $4.6 \cdot 10^{-3}$ mole/kg of composition.

The mixture was stirred vigorously for a few minutes at ambient temperature and then this mixture was deposited (approximately 1 g/m²) on paper without using a solvent, by means of a coating bar; the coated paper was passed under a UV lamp at a distance of 5.6 cm from the lamp and the silicone composition was hardened in an oven with forced air circulation, controlled at 100° C. The irradiation time was 0.20 second. The UV lamp employed was a 5,000 W Philips type HOK6 lamp with a linear density of 8,000 W per m.

In this manner, the hardening of the silicone coating was studied by noting the minimum residence time in the oven, with or without a preliminary UV treatment, which was required to produce a properly hardened coating. Furthermore, the rise in viscosity of the composition with time in the catalyzed bath was measured to assess the effectiveness of the azodicarboxylates as an inhibitor. The results obtained are reported in Table I below.

EXAMPLES 2 TO 6

The procedure of Example 1 was repeated, except that the amount of the inhibitor was changed; the results are also reported in Table I below:

TABLE I

| Example | Concentration of EADC % | Concentration of EADC Moles/kg | Crosslinking Time Oven, at 110° C., without UV (sec) | Crosslinking Time Oven, at 110° C., with UV (sec) | Gel time at 20° C. (hours) |
|---|---|---|---|---|---|
| 1 | 0.08 | $4.6 \cdot 10^{-3}$ | 15 | 8–10 | 6 hours |
| 2 | 0.09 | $5.5 \cdot 10^{-3}$ | 18 | 8–10 | 10 hours |
| 3 | 0.10 | $6 \cdot 10^{-3}$ | 18–10 | 8–10 | 24 hours |
| 4 | 0.15 | $8.6 \cdot 10^{-3}$ | 30–35 | 10 | 60 hours |
| 5 | 0.20 | $1.15 \cdot 10^{-2}$ | 80 | 10–12 | 30 days |
| 6 | 0.30 | $1.7 \cdot 10^{-2}$ | 100 | 15 | >30 days |

EXAMPLE 7 TO 10

To 100 g of polydimethylsiloxane oil with dimethylvinylsiloxy end groups (0.4% by weight of vinyl groups in relation to polymer weight) having a viscosity of 600 mPa.s at 25° C., were added 41.5 g of pyrogenic silica having a specific surface of 300 m²/g, treated with hexamethyldisilazane. To this dough was added an organosilicon composition containing:
  (a) 4 g of a polydimethylsiloxane copolymer containing hydromethylsiloxy moieties in the chain, having 0.24% of hydrogen atoms bonded to silicon, based on the weight of the polymer, and approximately 120 silicon atoms per molecule, and
  (b) 4 g of a polydimethylsiloxane polymer with dimethylhydrosiloxyl end groups, having a viscosity of 30 mPa.s at 25° C.

To this composition was added a platinum catalyst which was the product of the reaction of chloroplatinic acid with octanol in accordance with the teaching of U.S. Pat. No. 3,220,972 in an amount such that 12 mg of platinum metal were added based on the total weight of the composition.

The composition was divided into 4 equal parts and increasing amounts of ethyl azodicarboxylate (EADC) were added.

An evaluation was made of bath stability and crosslinking time at 150° C., measured for an elastomer composition film 500 μm in thickness, deposited onto a polyethylene-coated paper.

The results obtained are reported in Table II below:

TABLE II

| Example | Concentration of EADC, in % by weight | Crosslinking time at 150° C. in min & sec | Bath Stability in hr & min |
|---|---|---|---|
| 7 | 0.0083 | 1 min | 3 hr, 30 min |
| 8 | 0.0109 | 2 min | >72 hr |
| 9 | 0.0130 | 2 min, 30 sec | 8 days |
| 10 | 0.018 | 2 min, 30 sec | >8 days |

While in the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A curable organopolysiloxane composition of matter, comprising (1) at least one substantially straight-chain organopolysiloxane having a viscosity ranging from about 50 to 100,000 mPa.s at 25° C. and containing at least x alkenyl unsaturated hydrocarbon groups bonded to a silicon atom, per molecule, wherein $x \geq 2$, (2) at least one organohydropolysiloxane crosslinking agent having a viscosity ranging from about 10 to 100,000 mPa.s at 25° C. and containing at least y hydrogen atoms bonded to silicon atoms, per molecule, wherein $y \geq 2$, (3) a catalytically effective amount of a platinum group metal crosslinking catalyst, and (4) an effective amount of at least one azodicarboxylate gelation inhibitor which is inert to the activity of said catalyst (3) and which inhibits gel formation at ambient temperatures, but in insufficient amount as to prevent the crosslinking of said polysiloxanes (1) and (2) under cross-linking conditions.

2. The organopolysiloxane composition as defined by claim 1, wherein $x+y \geq 5$.

3. The organopolysiloxane composition as defined by claim 2, wherein said azodicarboxylate (4) has the general formula:

$$R_1OCC-N=N-COOR_2 \quad (I)$$

or

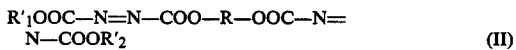
$$R'_1OOC-N=N-COO-R-OOC-N= \\ N-COOR'_2 \quad (II)$$

in which $R_1$, $R_2$, $R'_1$ and $R'_2$, which may be identical or different, are each a straight or branched chain alkyl radical having from 1 to 12 carbon atoms, and R is an alkylene radical, $-CH_2)_n$, wherein n ranges from 1 to 12.

4. The organopolysiloxane composition as defined by claim 3, wherein said azodicarboxylate (4) has the general formula (I).

5. The organopolysiloxane composition as defined by claim 3, wherein said azodicarboxylate (4) has the general formula (II).

6. The organopolysiloxane composition as defined by claim 4, wherein said azodicarboxylate (4) comprises methyl or ethyl azodicarboxylate.

7. The organopolysiloxane composition as defined by claim 3, said organopolysiloxane (1) containing essentially only methyl and vinyl groups per molecule, and said organohydropolysiloxane (2) containing essentially only methyl and $\equiv$SiH groups per molecule.

8. The organopolysiloxane composition as defined by claim 3, said azodicarboxylate (4) having a boiling point of at least 25° C.

9. The organopolysiloxane composition as defined by claim 3, comprising, per 100 parts by weight of said organopolysiloxane (1), about 0.1 to 50 parts by weight of said organohydropolysiloxane (2), and about 0.01 to 3 parts by weight of said azodicarboxylate (4).

10. The organopolysiloxane composition as defined by claim 9, comprising from about 5 to 1,000 ppm of said catalyst (3).

11. The organopolysiloxane composition as defined by claim 2, dispersed in or diluted with a volatile organic solvent compatible therewith.

12. The organopolysiloxane composition as defined by claim 11, said solvent comprising from about 50 to 99% by weight thereof.

13. The organopolysiloxane composition as defined by claim 2, having a viscosity not exceeding 5,000 mPa.s at 25° C.

14. A shaped substrate coated with a layer of the organopolysiloxane composition as defined by claim 1.

15. The shaped substrate as defined by claim 14, the same comprising a metal, wood, glass, paper, or plastic substrate.

16. The shaped substrate as defined by claim 15, coated with a thin peelable layer of said organopolysiloxane composition.

17. A process for forming an organopolysiloxane coating composition comprising crosslinking the composition of claim 1 with ultraviolet radiation.

* * * * *